June 2, 1970  A. W. KAMMERER  3,515,889
POWER GENERATION APPARATUS
Filed Aug. 14, 1967  4 Sheets-Sheet 1

INVENTOR.
ARCHER W. KAMMERER
BY Bernard Kriegel
ATTORNEY.

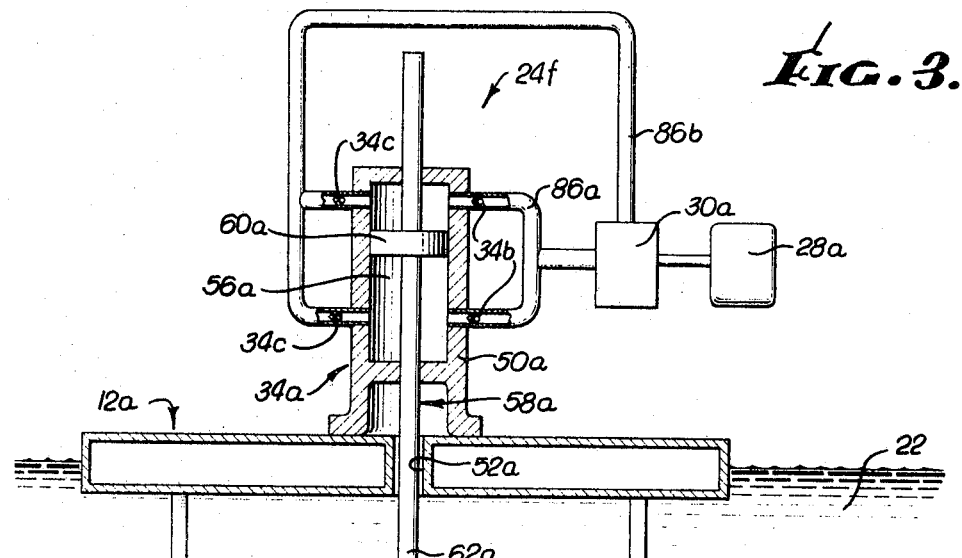
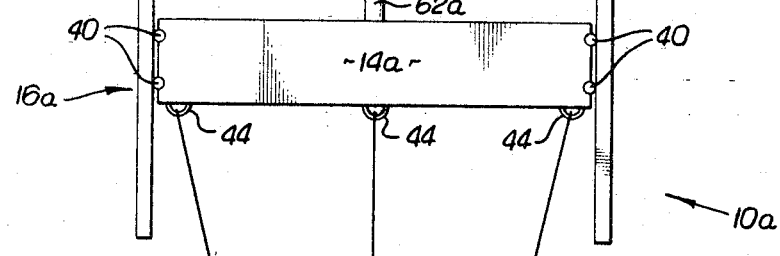
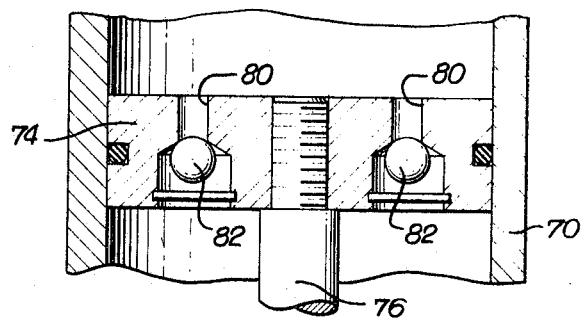
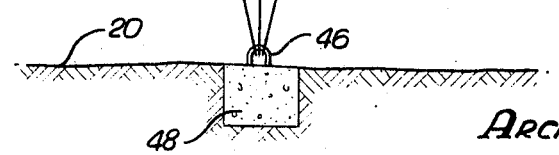

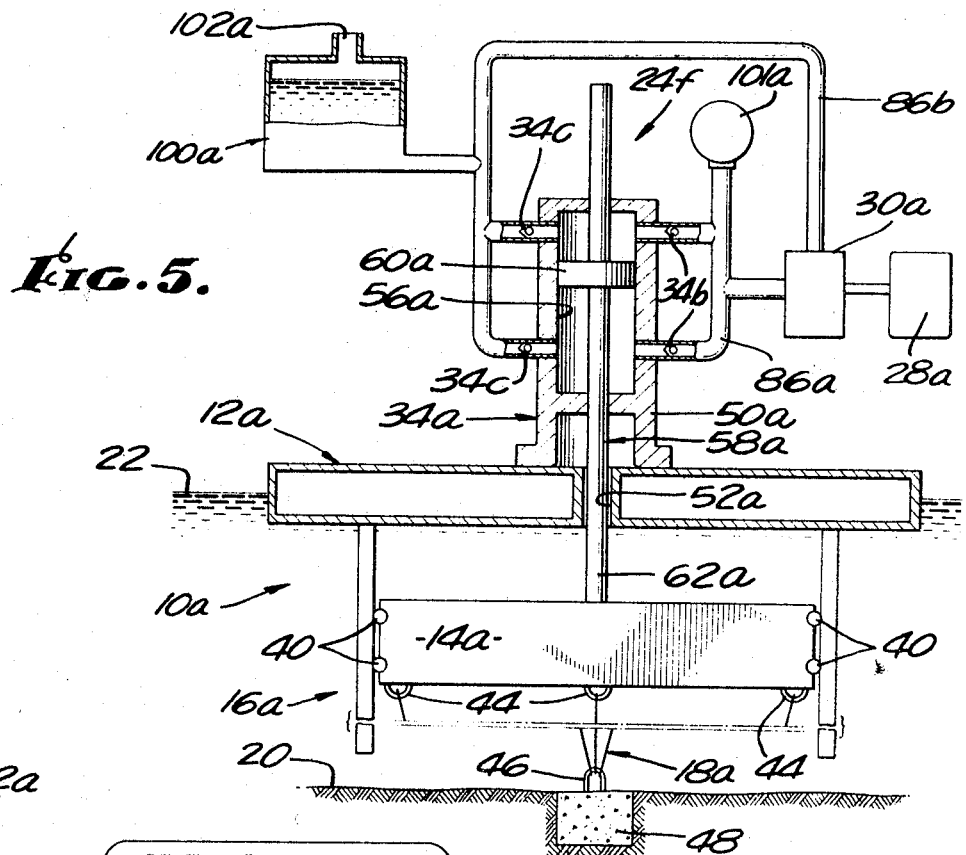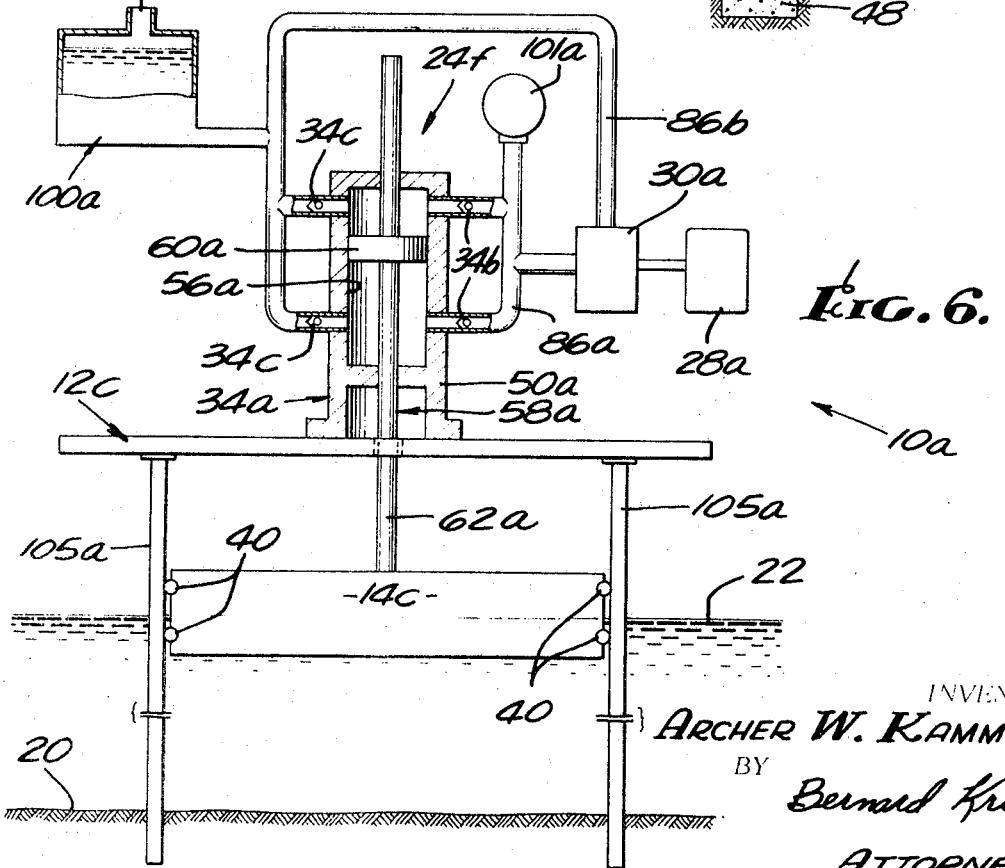

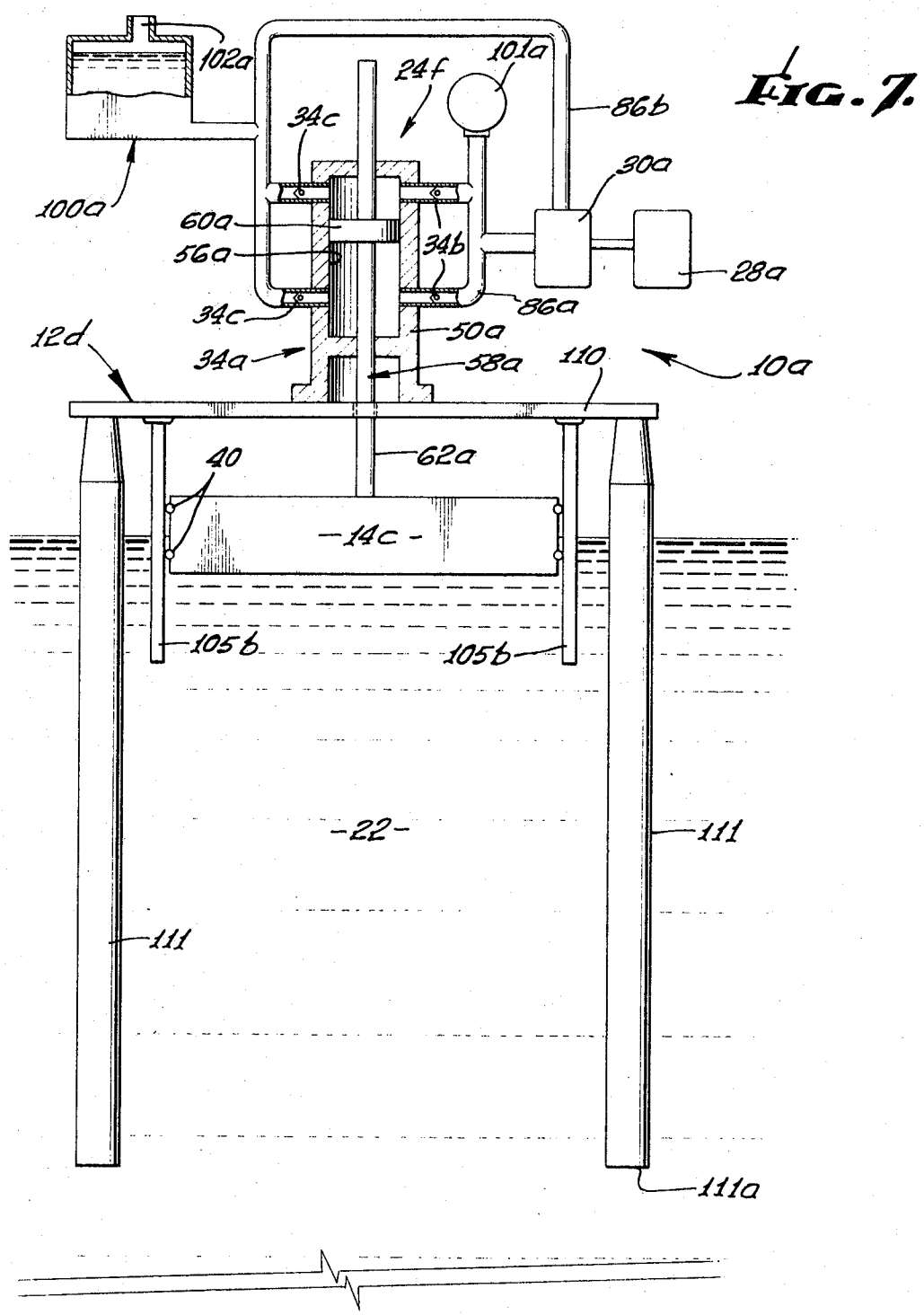

United States Patent Office 3,515,889
Patented June 2, 1970

3,515,889
POWER GENERATION APPARATUS
Archer W. Kammerer, Fullerton, Calif., assignor of one-fifth each to Jean K. Lamphere and Archer W. Kammerer, Jr., both of Fullerton, Calif.
Continuation-in-part of application Ser. No. 627,948, Apr. 3, 1967. This application Aug. 14, 1967, Ser. No. 662,842
Int. Cl. F03b *13/10, 13/12*
U.S. Cl. 290—53                                23 Claims

ABSTRACT OF THE DISCLOSURE

A floating wave-driven power generating station having a buoyant structure or platform to float at the surface of a body of water, a float to be anchored in a generally stationary submerged position below the platform in such a way that surface waves cause the platform to rise and fall in a vertical reciprocating motion relative to the float, and power generating means connected to and operated by the wave-induced relative reciprocating motion of the platform and float for transforming the kinetic energy of the rising and falling platform into useful energy, such as electrical power.

---

This application is a continuation-in-part of my application Ser. No. 627,948, filed Apr. 3, 1967, for "Power Generation Apparatus," now abandoned.

This invention relates generally to power generating devices, and more particularly to a novel floating wave-driven power generating station.

Offshore oil exploration and well drilling are now quite common, owing to the ever-increasing demand for petroleum products and improvements in offshore exploration and drilling techniques. These offshore activities often involve the use of a floating barge for supporting the equipment and crew. Barges for this purpose are relatively large, weighing on the order of several thousand tons, and have living quarters for the crew who may live on board for long periods of time. A floating offshore station of this kind obviously requires much electrical power for operating equipment, as well as lighting and perhaps heating the station, particularly the crew's quarters. Heretofore, this electrical power has been generated by diesel powered generating units, or the like.

The present invention may be utilized to advantage in offshore stations of the kind just mentioned for generating much, and perhaps all, of the electrical power required for station operation, depending upon the size and power requirements of the station. However, it will become evident as the description proceeds that the present floating power generating station may be used for other purposes. For example, the sole purpose of the station may be to generate power. In this case, a present power generating station conceivably may be totally unattended except for periodic servicing by maintenance personnel. Moreover, while the invention is concerned primarily with the generation of electrical power, it is possible that a present generating station may be utilized for other purposes and to produce other forms of power or energy, such as to operate pumps, gas compressors, drive a variety of mechanical devices, etc.

It is a general object of the invention to provide a floating power generating station, which is effective to transform the wave energy in a body of water to useful energy, such as electrical power.

Another object of the invention is to provide a floating wave-driven power generating station of the character described, which may be designed for use as an offshore well drilling station and is effective to generate a portion or all of the power required for operation of such a drilling station.

A further object of the invention is to provide a floating wave-driven power generating station of the character described, which is relatively simple in construction, reliable in operation, and otherwise ideally suited to its intended purposes.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

FIG. 2 is an enlargement of the area enclosed by the circular arrow 2—2 in FIG. 1;

FIG. 3 is a semidiagrammatic elevational view of a modified floating wave-driven power generating station according to the invention, with parts broken away for the sake of clarity;

FIG. 5 is a view similar to FIG. 3 of another specific form of floating wave-driven power generating station;

FIG. 6 is a view similar to FIG. 3 of yet another embodiment of a floating wave-driven power generating station;

FIG. 7 is a view similar to FIGS. 3 and 6 of still another form of floating wave-driven power generating station.

Figure 1:
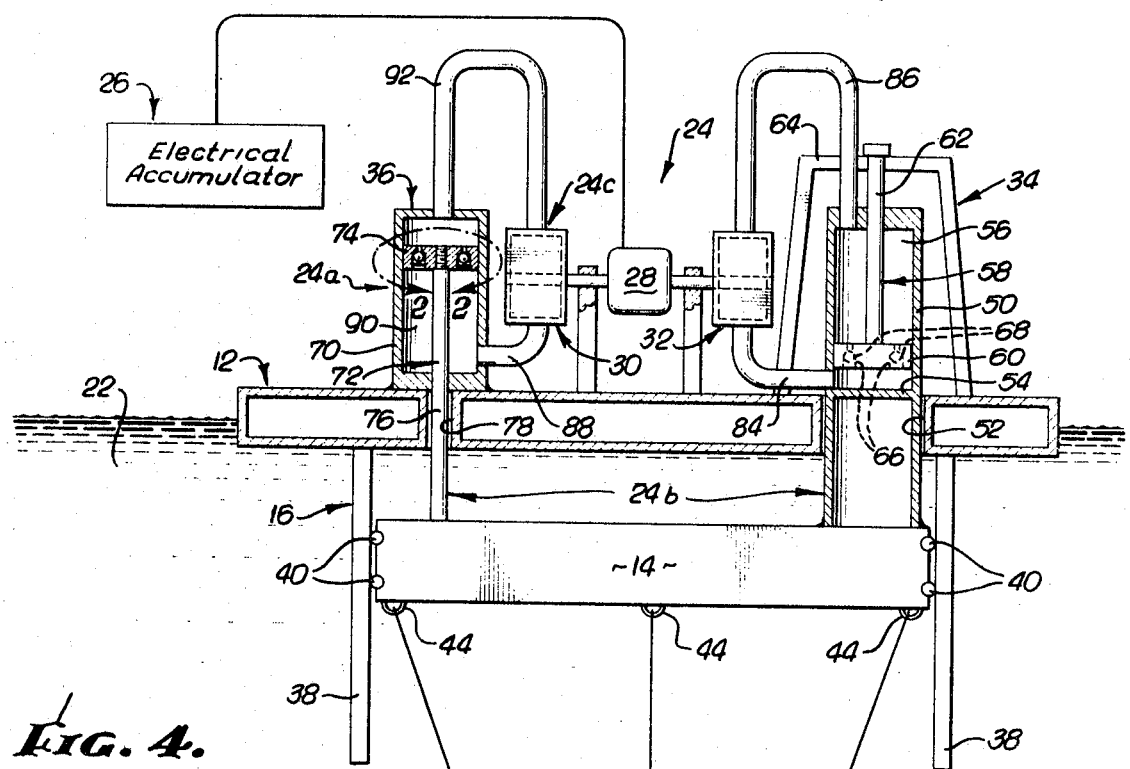
FIG. 1 is a semidiagrammatic elevational view of a floating wave-driven power generating station according to the invention, with parts shown in section for the sake of clarity.

According to its broader aspects, the invention provides a floating wave-driven power generating station, represented in FIG. 1 of the drawings by the station 10, having a buoyant structure or platform 12, a float 14 below the platform, means 16 interrelating the platform and float for limited relative vertical movement thereof, anchoring means 18 attached to the float for anchoring the float to the floor 20 of a body 22 of water, such as the ocean, in a manner that the float assumes a generally stationary submerged floating position a distance below the surface of the water, with the platform floating at the surface. Surface waves cause the platform to rise and fall in a generally vertical reciprocating motion relative to the float, power generating means 24 operatively connected between the platform and float, and actuated by the wave-induced relative vertical reciprocating motion of the platform and float, converting the kinetic energy of the platform during such reciprocating motion thereof to useful energy. Preferably, the power generating means 24 include energy storage means 26 for storing the energy produced by the generating means during wave activity at the surface of the water 22, thus to provide available energy when such wave activity is non-existent or of too low intensity to effectively operate the generating means. As noted earlier, a present generating station may be designed to transform wave energy into various forms of useful energy. The generating means 24 embodied in the generating station 10 of FIG. 1, for example, comprise electrical power generating means. In this case, the energy storage means 26 may comprise electrical storage batteries.

It will become evident from the ensuing description that a present floating wave-driven power generating station may utilize various types of generating means, particularly electrical power generating means. The electrical power generating means 24 embodied in the floating station 10 of FIG. 1, for example, has relatively movable and stationary generator elements 24a, 24b which are attached to the buoyant platform 12 and float 14, respectively, for relative reciprocation during the wave-induced reciprocating motion of the platform, and energy conversion means 24c for converting the relative reciprocating motion of the generator elements to electrical energy. In the case of the power generating station illustrated in FIG. 1, the energy conversion means 24c include an electrical generator 28, hydraulic motors 30 and 32 for driving the generator, and a pair of single acting hydraulic pumps 34, 36 for supplying hydraulic working fluid under pressure to the motors. The hydraulic pumps 34, 36 operate in out-of-phase relation in such a way that pump 34 is effective to drive the generator during each downstroke of the buoyant platform 12, and pump 36 is effective to drive the generator during each upstroke of the platform.

Referring now in greater detail to the floating electrical power generating station 10 which has been selected for illustration in FIG. 1, the platform 12 and float 14 may have any suitable buoyant construction. Representative of the means for connecting or interrelating the platform and float are the means 16 which comprise a number of vertical guides 38 rigidly secured to and depending from the underside of the platform. The float 14 is supported within the guides 38 for movement therealong in any convenient way, as by means of bearings or rollers 40 on the float which ride on the guides. The illustrated float anchoring means 18 include a number of tether cables 42, the upper ends of which are secured to rings 44 affixed to the underside of the float 14. The cables 42 converge toward their lower ends which are secured to a ring 46 attached to a concrete anchor block 48 embedded in the ocean floor 20 to effect anchoring of the float 14 in a generally stationary submerged position in the water. It will be understood, of course, that additional cables may be attached between the float 14 and the floor 20 to resist any lateral or horizontal forces on the floating station, and that the number of anchoring blocks 48 can be increased.

The hyraulic pump 34 of the generating station 10 has a vertical cylinder 50 which slides in a bearing 52 within the platform 12 and is rigidly secured at its lower end to the float 14. Fixed to and extending across the interior of the cylinder 50 intermediate its ends is a partition 54. This partition defines a working chamber 56 in the upper end of the cylinder. Movable in the working chamber 56 is a plunger 58 having a piston 60 which slides in the cylinder, and a piston rod 62 which extends slidably through and is sealed to the upper end wall of the cylinder. The upper exposed end of the piston rod 62 is anchored to a rigid frame 64 which extends downwardly along opposite sides of the cylinder 50 and is firmly attached to the platform 12. Extending through the piston 60 are a number of passages 66 containing ball check valves 68. These check valves permit downward fluid flow through the piston passages 66, but block reverse flow to these passages.

The hydraulic pump 36 includes a vertical cylinder 70 securely fixed to the platform 12. Movable in the cylinder is a plunger 72, including a piston 74, which slides in the cylinder, and a piston rod 76 which extends slidably through and is sealed to the lower end of the cylinder and which also is slidable through a bearing 78 in the platform 12. The lower end of the piston rod 76 is firmly attached to the float 14. Extending through the piston 74 are passages 80 containing ball check valves 82. Check valves 82 permit downward fluid flow through the piston passages 80 and block reverse flow through these passages.

The intake of the hydraulic motor 32 communicates with the lower end of the working chamber 56 in the hydraulic pump 34 via a high pressure flexible fluid line 84. A low pressure flexible return line 86 communicates the outlet of the motor with the upper end of the working chamber 56. The intake of the hydraulic motor 30 communicates, via a high pressure fluid line 88, with the lower end of the working chamber 90 in the hydraulic pump 36. A low pressure return line 92 communicates the outlet of the motor 30 with the upper end of the working chamber 90.

It will now be understood that during upward movement of the platform 12 relative to the float 14, the plunger 58 of hydraulic pump 34 moves upwardly relative to its cylinder 50, and the cylinder 70 of hydraulic pump 36 moves upwardly relative to its plunger 72. Downward movement of the platform relative to the float results in reversed relative movement of the respective cylinders and plungers. During the upward movement of the plunger 58 of pump 34 relative to its cylinder 50, which occurs during upward movement of the platform 12, the check valves 68 in the plunger piston 60 unseat to permit relatively unrestricted flow of hydraulic working fluid from the upper end of the working chamber 56 to the lower end of this chamber. Accordingly, the hydraulic motor 32 is not driven by the pump 34. On the other hand, the upward movement of the cylinder 70 of pump 36 relative to its plunger 72, which occurs during upward movement of the platform 12 relative to the float 14, results in seating of the check valves 82 in the plunger piston 74. Hydraulic working fluid is thereby displaced under pressure from the lower end of the working chamber 90 in the pump 36, through the line 88 to the hydraulic motor 30, exhausting through the line 92 to the upper end of the working chamber 90. The hydraulic motor 30 is thereby rotated to drive the generator 28.

During downward movement of the platform 12 relative to the float 14, the check valves 68 in the piston 60 of the pump 34 seat to effect displacement of hydraulic working fluid from the lower end of the pump working chamber 56, through the line 84 to the hydraulic motor 32, discharging therefrom through the line 86 to the upper end of the chamber, thus to drive the motor. The check valves 82 in the piston 74 of pump 36, on the other hand, unseat to permit displacement of working fluid from the upper end of the working chamber 90 to the lower end of this chamber through the piston passages 80. Accordingly, the hydraulic motor 30 is not driven by the pump 36.

It is evident at this point, therefore, that during each downstroke of the platform 12 relative to the float 14, the hydraulic motor 32 is driven by the pump 34. During each upstroke of the platform relative to the float, the hydraulic motor 30 is driven by the pump 36. The motors 30, 32 are coupled to the generator 28 in such a way as to drive the generator in the same direction. Thus, the generator is driven during both upward and downward movement of the platform 12 relative to the float 14.

In operation of the floating wave-driven generating station 10, the float 14 is anchored in position in such a way that it assumes a generally stationary submerged floating position a suitable distance below the surface of the water 22, as shown. The buoyant platform 12 floats at the surface and is free to move vertically relative to the float. Accordingly, wave motion on the surface of the water is effective to cause the platform to rise and fall in a vertical reciprocating motion relative to the float. During this vertical reciprocating motion of the platform 12, the pumps 34, 36 supply hydraulic working fluid under pressure to the motors 30, 32 in alternate sequence, and these motors, in turn, drive the generator 28. Thus, the electrical generating means 24 of the station 10 is effective to convert wave energy to electrical energy, which may be stored in the energy storage means or batteries 26.

The modified floating wave-driven power generating station 10a illustrated in FIG. 3 is basically similar to that just described. Thus, station 10a has a buoyant platform 12a, a float 14a, means 16a connecting the platform and float for relative vertical movement thereof, anchoring means 18a for securing the float in a generally stationary submerged position, whereby the platform 12a rises and falls in a vertical reciprocating motion relative to the float during wave action on the surface of the water 22, and electrical generating means 24f for transforming the kinetic energy of the platform, during its reciprocating motion, to electrical energy. The electrical generating means 24f include an electrical generator 28a, a hydraulic motor 30a for driving the generator, and a double-acting hydraulic pump 34a for supplying hydraulic fluid under pressure to the motor. Pump 34a has a cylinder 50a containing a plunger 58a, which includes a piston 60a movable in the cylinder working chamber 56a and a piston rod 62a extending from the underside of the cylinder 50a. The lower extending end of the piston rod 62a is slidably guided in a bearing 52a in the platform 12a and is rigidly secured to the float 14a. Thus, rising and falling motion of the platform 12a relative to the float 14a, occasioned by wave action on the surface of the water 22, causes reciprocating motion of the plunger 58a in the cylinder 50a.

Extending from the cylinder 50a to the intake of the hydraulic motor 30a is a high pressure fluid 86a. The cylinder end of this fluid line is branched to communicate the motor intake to opposite ends of the pump working chamber 56a. Mounted within the branches of the fluid line 86a are check valves 34b which unseat to permit fluid flow in one direction only from the hydraulic pump 34a to the hydraulic motor 30a. The outlet of the hydraulic motor 30a is connected to the hydraulic pump 34a by a low pressure fluid return line 86b, the pump end of which is branched to communicate the motor outlet to opposite ends of the pump working chamber 56a. The two branches of the return line 86b contain check valves 34c which unseat to permit fluid flow from the motor to the pump, but prevent reverse flow of fluid to the motor.

It is now evident that the hydraulic pump 34a of the floating power generating station 10a is effective to supply hydraulic working fluid under pressure to the motor 30a during both strokes of the pump plunger 58a, and, therefore, during both upward and downward movement of the station platform 12a relative to the float 14a. Here again, therefore, the generator 28a is driven to produce an electrical output in response to rising and falling of the platform relative to the float as a result of wave action on the surface of the water 22.

Figure 4:
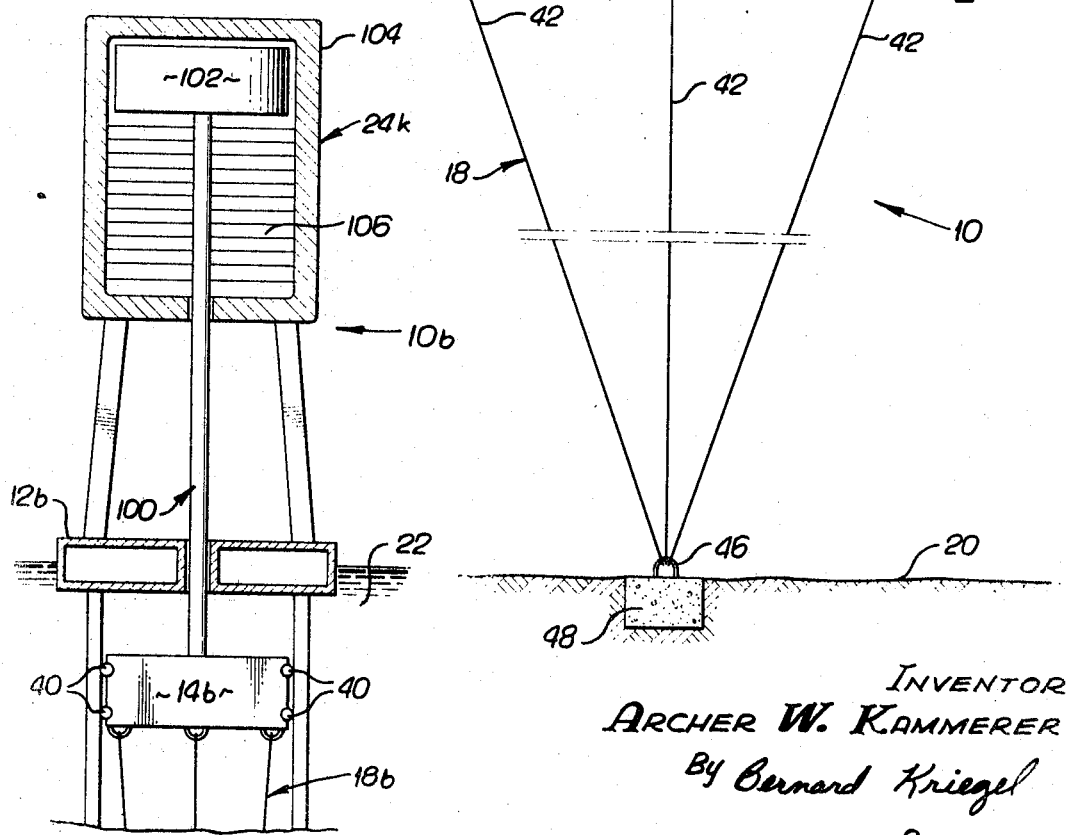
FIG. 4 is a fragmentary semidiagrammatic elevational view of a further modified floating wave-driven power generating station according to the invention, with parts sectioned for the sake of clarity.

The modified floating power generating station 10b illustrated in FIG. 4 is basically similar to the earlier described generating stations. The modified floating station 10b, however, employs a linear type of electrical generating means 24k, including a plunger 100 mounting a magnetic armature 102, which reciprocates within a cylindrical housing or field 104. Housing 104 contains a winding 106 in which an electrical voltage and current are induced in response to relative reciprocating motion of the armature and winding. The rod of plunger 100 extends through the buoyant station platform 12b and is secured at its lower end to the stationary float 14b. The generator housing 104 is secured to the platform 12b. As in the previous forms of the invention, the float 14b is anchored in a generally stationary submerged position by anchoring means 18b.

It is now evident that wave motion on the surface of the water 22 causes the platform 12b to rise and fall in a vertical reciprocating motion relative to the float 14b, and thereby relatively reciprocates the armature 102 and field 106. This relative reciprocating motion of the armature and winding induces a corresponding voltage and current which can be conducted to a suitable point of use or storage.

In the form of invention illustrated in FIG. 5, the floating wave-driven power generating station is essentially the same as the modification shown in FIG. 3 with the addition of a reservoir 100a connected to the low pressure line 86b and an accumulator 101a connected to the high pressure fluid line 86a. In all other respects, the station or system is the same as illustrated in FIG. 3.

The reservoir 100a may have an upper opening 102a to the atmosphere, and will contain a reserve or body of liquid circulated in the system, the reciprocation of the cylinder 50a relative to the piston 60a drawing liquid from the reservoir, as well as from the low pressure line, past the inlet check valves 34c and discharging such liquid alternately from the upper and lower sides of the cylinder past the outlet check valves 34b and through the high pressure fluid line 86a to the fluid motor 30a. Hydraulic fluid under pressure is maintained at all times in the high pressure fluid line 86a, since it is communicating with the accumulator 101a which has a body of a suitable gas, such as nitrogen, in its upper portion under pressure bearing against hydraulic fluid in its lower portion.

Because of the use of the accumulator 101a and the reservoir 100a in the system, as illustrated in FIG. 5, liquid under pressure is always being forced through the hydraulic motor 30a to insure its continued rotation, despite the fact that the cylinder 50a comes to rest at the lower end and the upper end of its travel with the buoyant platform 12a. At the end of each stroke, the accumulator 101a continues to supply fluid under pressure to the hydraulic motor 30a, and such fluid can discharge from the hydraulic motor through the low pressure line 86b to the reservoir 100a, which not only functions as a supply of liquid to be drawn into opposite ends of the cylinder, but also as a surge tank.

In the form of invention disclosed in FIG. 6, the floating wave-driven power generating station or system operates in the same manner as the one illustrated in FIG. 5. However, instead of the plunger 58a and its piston 60a being held stationary, and the cylinder 50a moving vertically therealong, the cylinder is held stationary and the plunger 58a and its piston 60a are reciprocated vertically by the action of the waves on the surface of the body of water 22. As disclosed, the plunger 58a is connected to a float 14c riding at the surface of the body of water and vertically along support legs 105a, or other guides, depending from and secured to the fixed platform 12c. As disclosed, the legs 105a support the fixed platform by being driven into the ocean floor 20, or by resting thereon, in any known manner in which fixed oil well drilling platforms are usually secured to the ocean floor.

The buoyant float 14c reciprocates vertically under wave action, shifting the plunger 58a vertically in the cylinder 50a and drawing the hydraulic fluid from the reservoir 100a and the low pressure line 86b alternately through the inlet check valves 34c into the upper and lower parts of the cylinder. The piston 60a, when moving in an upward direction within the cylinder, will force the fluid under pressure through the upper discharge check valve 34b into the high pressure line 86a, and then through the hydraulic motor 30a to rotate the latter, as well as the electric generator 28a connected thereto. When the piston 60a reaches the upper end of its stroke, the accumulator 101a will continue to supply fluid under pressure to the hydraulic motor 30a, such fluid under pressure exhausting through the low pressure line 86b to the reservoir 100a. During the downward stroke of the buoyant float 14c and piston 60a, the fluid in the lower portion of the cylinder is forced through the lower discharge valve 34b and the high pressure fluid line 86a to the hydraulic motor 30a, exhausting therefrom through the low pressure line 86b to the reservoir 100a. When the piston reaches the lower end of its stroke, the accumulator 101a will continue to supply fluid under pressure through the high pressure fluid line 86a to the hydraulic motor 30a, continuing to rotate the latter, as well as the electric generator connected thereto.

In the form of invention disclosed in FIG. 7, the power generating station is essentially the same as the one disclosed in FIG. 6. However, instead of a fixed platform 12c being used, a semisubmersible drilling barge or platform 12d is employed having very little vertical movement. The float 14c partakes of substantial vertical movement under wave action, in order to reciprocate the piston 60a in the cylinder 50a. The semisubmersible drilling barge 12d includes an upper structure 110 supported, in a known manner, by a plurality of hollow legs 111 that are buoyant in the body of water 22. As is well known in the offshore oil well drilling art, such semisubmersible drilling barges 12d have the major portion of their mass below the surface of the body of water, so that the barge actually partakes of very little vertical movement, if any, despite wave action and the action of the wind. If the barge 12d does move vertically, the extent of such movement is considerably less than the vertical movement that the float 14c partakes of under the action of waves on the surface of the body of water. As disclosed, the lower ends 111a of the buoyant legs 111 are above the ocean floor 20, and the float 14c is guided in its vertical movement relative to the drilling barge 12d by vertical guides 105b depending from the upper structure 110 in much the same manner as the vertical guides 105a function in connection with the float 14c in FIG. 6.

The operation of the power generation station disclosed in FIG. 7 is virtually the same as in the form of invention illustrated in FIG. 6. As described above, the semisubmersible drilling barge 12d partakes of very little, if any, vertical movement; whereas, the buoyant float 14c reciprocates vertically under wave action to shift the plunger 58a vertically in the cylinder 50a, to draw the hydraulic fluid from the reservoir 100a and the low pressure line 86b alternately through the inlet check valves 34c into the upper and lower parts of the cylinder. The piston 60a alternately forces the fluid under pressure through the upper and lower discharge check valves 34b into the high pressure line 86a, and then through the hydraulic motor 30a to rotate the latter, as well as the electric generator 28a connected thereto, the fluid exhausting through the low pressure line 86b to the reservoir 100a. The accumulator 101a functions in the same manner as described above in connection with FIG. 6, to continue to supply fluid under pressure to the hydraulic motor 30a when the piston 60a reaches the upper and lower ends of its stroke. Since the system disclosed in FIG. 7 is virtually the same as shown in FIG. 6, the same reference numerals have been applied to the parts, with the exception of the semisubmersible drilling barge 12d, its components, and the vertical guides 105b.

I claim:

1. A floating wave-driven power generating station: comprising a buoyant platform, a float below said platform, means connecting said platform and float for limited relative vertical movement thereof, anchoring means attached to said float for anchoring said float to the floor of a body of water in such a way that said float assumes a generally stationary submerged floating position a distance below the surface of the water and said platform floats at said water surface, whereby surface waves cause said platform to rise and fall in a generally vertical reciprocating motion relative to said float, and power generating means operatively connected between said platform and float and actuated by wave-induced relative reciprocating motion of said platform and float for converting the kinetic energy of said platform during said reciprocating motion thereof to useful energy.

2. A power generating station according to claim 1; wherein said power generating means include energy storage means for storing said useful energy.

3. A power generating station according to claim 1; wherein said power generating means comprise electrical power generating means, and electrical energy storage means for storing the electrical energy produced by said power generating means.

4. A power generating station according to claim 1; wherein said power generating means are supported on said platform and comprise driven means attached to said float.

5. A power generating station according to claim 1; wherein said power generating means comprise a relatively stationary generator element attached to said float, a relatively movable generator element attached to said platform, said movable element being driven in a reciprocating motion relative to said stationary element during said wave-induced reciprocating motion of said platform, and energy conversion means for converting the relative reciprocating motion of said generator elements to electrical energy.

6. A power generating station according to claim 1; wherein said generating means comprise an electrical generator, hydraulic motor means for driving said generator, and hydraulic pumping means operatively connected between and driven by wave-induced relative reciprocating motion of said platform and float for supplying pressurized hydraulic working fluid to said motor means.

7. A power generating station according to claim 6; wherein said pumping means comprise a pair of single-acting hydraulic reciprocating pumps acting in out-of-phase relation in such manner that one pump delivers high pressure working fluid to said motor during each upward stroke of said platform relative to said float, and the other pump delivers high pressure working fluid to said motor means during each downward stroke of said platform relative to said float.

8. A power generating station according to claim 7; wherein one pump includes a cylinder attached to said platform and a plunger attached to said float, and the other pump includes a plunger attached to said platform and a cylinder attached to said float.

9. A power generating station according to claim 1; wherein said generating means comprise an electrical generator, hydraulic motor means for driving said generator, and a double-acting hydraulic reciprocating pump operatively connected between and driven by wave-induced relative reciprocating motion of said platform and float for supplying hydraulic working fluid under pressure to said motor means.

10. A power generating station according to claim 1; wherein said generating means comprise a reciprocating electrical generator including a cylindrical housing and plunger operatively connected between said platform and float in such a way that said housing and plunger undergo relative axial reciprocation during wave-induced relative reciprocating motion of said platform and float, said housing containing a winding, and said plunger including a magnetic armature for inducing electrical current in said winding during relative axial reciprocation of said armature and winding.

11. A power generating station according to claim 1; wherein said connecting means comprise guides depending from the underside of said platform, and bearing means supporting said float on said guides for relative movement therealong, and said anchoring means comprise cables attached at one end to said float and means at the other ends of said cables for securing said cables to the floor of said body of water.

12. In a floating wave-driven power generating station: a float to be anchored in a generally stationary submerged position below the surface of a body of water, a buoyant platform to float at said water surface over said float, whereby said platform rises and falls in a vertical reciprocating motion relative to said float during wave action at said surface, and coacting means on said platform and float connecting said platform to said float for limited vertical movement relative to said float while restraining said platform against lateral movement relative to said float.

13. The combination according to claim 12; including power generating means operatively connected between said platform and float and operated by vertical movement of said platform relative to said float for converting the kinetic energy of said platform during wave-induced vertical reciprocating motion of said platform to useful energy.

14. A wave-driven power generating station: comprising a platform member disposed at least partially above a body of water, a float member, means connecting said platform member and float member for limited relative vertical movement therebetween, means for limiting the extent of vertical movement of one of said members in the body of water, whereby surface waves cause said other of said members to rise and fall in a generally vertical reciprocating motion relative to said one of said members, and power generating means operatively connected between said members and actuated by wave-induced reciprocating motion of said other of said members for converting the kinetic energy of said other of said members during said reciprocating motion to useful energy, said power generating means comprising vertical cylinder means connected to one of said members, vertical piston means reciprocable in said cylinder means and connected to the other of said members, one of said cylinder means and piston means being mounted on said platform, a hydraulic motor on said platform connected to said cylinder means to receive fluid pumped therefrom in response to relative vertical movement between said piston means and cylinder means as said members move vertically with respect to each other, and a mechanism driven by said hydraulic motor.

15. A power generating station according to claim 14; wherein said mechanism comprises an electrical generator.

16. A power generating station according to claim 13; wherein inlet and outlet pressure lines are connected to and between said cylinder means and motor, a hydraulic fluid accumulator being connected to said inlet pressure line, and a reservoir being connected to said outlet pressure line.

17. A power generating station according to claim 14; wherein said platform member is secured to the floor of the body of water, said float member rising and falling in the body of water by wave-induced reciprocating motion.

18. A power generating station according to claim 17; wherein said mechanism comprises an electrical generator.

19. A power generating station according to claim 18; wherein inlet and outlet pressure lines are connected to and between said cylinder means and motor, a hydraulic fluid accumulator being connected to said inlet pressure line, and a reservoir being connected to said outlet pressure line.

20. A power generating station according to claim 14; wherein said one of said members is buoyant in the body of water.

21. A power generating station according to claim 14; wherein said one of said members is said platform member, said platform member being buoyant in the body of water.

22. A power generating station according to claim 20; wherein said mechanism comprises an electrical generator.

23. A power generating station according to claim 22; wherein inlet and outlet pressure lines are connected to and between said cylinder means and motor, a hydraulic fluid accumulator being connected to said inlet pressure line, and a reservoir being connected to said outlet pressure line.

References Cited
UNITED STATES PATENTS

| | | | |
|---|---|---|---|
| 987,685 | 3/1911 | Atkinson | 290—42 X |
| 1,864,499 | 6/1932 | Grigsby | 290—42 X |
| 2,112,633 | 3/1938 | Moon | 290—55 |
| 3,362,336 | 1/1968 | Kafka | 290—42 X |

ORIS L. RADER, Primary Examiner

W. E. DUNCANSON, JR., Assistant Examiner